(12) United States Patent
DePietro

(10) Patent No.: US 8,245,251 B2
(45) Date of Patent: Aug. 14, 2012

(54) METHOD AND APPARATUS FOR PREDICTIVE TUNING IN DIGITAL CONTENT RECEIVERS

(75) Inventor: Mark DePietro, Harleysville, PA (US)

(73) Assignee: General Instrument Corporation, Horsham, PA (US)

( * ) Notice: Subject to any disclaimer, the term of this patent is extended or adjusted under 35 U.S.C. 154(b) by 1788 days.

(21) Appl. No.: 10/314,106

(22) Filed: Dec. 6, 2002

(65) Prior Publication Data

US 2004/0111741 A1 Jun. 10, 2004

(51) Int. Cl.
*H04N 7/10* (2006.01)
*G06F 3/00* (2006.01)
(52) U.S. Cl. ............... 725/34; 725/32; 725/46; 725/59
(58) Field of Classification Search .................. 725/34, 725/46, 37, 38, 59
See application file for complete search history.

(56) References Cited

U.S. PATENT DOCUMENTS

| | | | |
|---|---|---|---|
| 6,115,080 A * | 9/2000 | Reitmeier | 348/731 |
| 6,334,217 B1 * | 12/2001 | Kim | 725/38 |
| 6,766,526 B1 * | 7/2004 | Ellis | 725/57 |
| 2003/0093792 A1 * | 5/2003 | Labeeb et al. | 725/46 |
| 2003/0159157 A1 * | 8/2003 | Chan | 725/151 |
| 2003/0226152 A1 * | 12/2003 | Billmaier et al. | 725/135 |
| 2003/0226153 A1 * | 12/2003 | Bessel et al. | 725/152 |

* cited by examiner

*Primary Examiner* — Brian Pendleton
*Assistant Examiner* — Jean D Saint Cyr
(74) *Attorney, Agent, or Firm* — Susan R. Payne

(57) ABSTRACT

Primary presentation stream is received and presented to user. Alternate presentation stream received according to channel prediction stands ready for presentation if user selects channel processed as alternate stream. Prediction is made according to pre-indication of channel selection or time-selected usage history.

11 Claims, 9 Drawing Sheets

METHOD AND APPARATUS FOR PREDICTIVE TUNING IN DIGITAL CONTENT RECEIVERS

FIELD OF THE INVENTION

This invention relates generally to television channel selection; and specifically to preprocessing digital signals according to a next channel prediction.

BACKGROUND OF THE INVENTION

Analog transmission techniques have historically been the dominant method of conveying content to television viewers. The advent of low cost digital signal processing devices has enabled the consumer to receive digital television. Digital conveyance of television signals has become commonplace, and the advantage of digital transmission over analog is evidenced by the continued displacement of analog channels with digital channels. In fact, digital transmission techniques have proven to be a key factor in the rapid growth and diversity of the type of content offered over digital television mediums such as satellite, terrestrial cable, and terrestrial "over-air" television.

The benefit of digital transmission techniques is recognized and valued by content providers and television viewers alike. The compression and signal replication mechanisms inherent in digital transmission offers channel densities and signal quality far superior to conventional analog television.

Digital television transmission has enabled the public to enjoy an enhanced television viewing experience. The digital television viewer can choose from a significantly larger selection of channels than could ever be transmitted using conventional analog techniques. Further, unlike its analog counterpart, digital transmissions deliver consistently high quality presentation of received content to the television viewer due their inherent insensitivity to impairments in the signal path.

Unfortunately, the very process that enables the numerous positive attributes of digital reception carries with it some negative consequences. The process of receiving a digital signal has the distinct disadvantage of introducing a noticeable time delay between the received signal and the presentation of the content to the viewer. The delay does not degrade the experience while watching a program, however, it is noticeable and can be quite annoying to the television viewer as one switches from one channel to another.

Analog television systems, in contrast, introduce virtually no perceivable time delay between the time that the signal is received and the time it is displayed. In fact, unlike digital transmission methods, the typical analog reception process requires no time-dependant processing of the signal and thus presents received content to the user almost instantaneously.

A digital presentation stream comprises digitized content fragmented into a contiguous stream of digitized data. The data needs to be received and reassembled into a logical block, or frame, before it can be properly conveyed to a television viewer. The amount of time needed to initially convey the content to a user is dependant upon the algorithm used to encode the content, and the proximity to the next valid block of received content. The reception process often results in a delay of one-half second or more between the time that a channel is first selected and the time that is presented to the user.

The absence of any perceivable time delay is a desirable attribute exhibited by an analog television receiver. This allows a user to switch between channels and experience almost no detectable delay between the time that a channel is selected and the time that the new channel is presented. The typical television viewer is highly accustomed to the speed that one can view a new channel after being switched from a previous channel. The ability to rapidly view and switch channels has led to common viewing behaviors such as "channel surfing" where the user samples one or more channels, often in rapid succession. Other typical viewing behaviors include switching among channels in a group of favorite channels and switching between channels in a group of recently viewed channels. The behaviors noted here are by no means exhaustive, and serve only to illustrate the point that the ability to rapidly switch and view new channels is a key facet of any modern analog television receiver. The imposition of any technical constraint that, among other things, hinders the ability to rapidly switch and view new channels is likely to be considered objectionable by typical television users.

A possible solution to eliminating the negative effect of time delay experienced in viewing digital television transmissions is to build a receiving unit capable of simultaneously receiving and processing every possible channel available to the user. A user with such a device could switch between the outputs of preprocessed channels within the device. The fact that the channels are preprocessed would eliminate the objectionable time delay that results when initially processing a newly received digital channel.

The cost and complexity of a unit capable of simultaneously receiving and processing every digital channel available to the television user would be exceedingly impractical. Recognizing this, some receivers provide two tuners. While one tuner is used to receive and process one channel, the receiver uses the second tuner to receive a second channel. These conventional receivers attempt to reduce channel switching latency by predicting what channel a user will tune to next. Although predictions can be made using simple prediction rules, such as simple channel surfing behavior where channels are selected in sequential fashion, conventional receivers do a poor job of eliminating delays except in some limited use cases.

There is a significant need for a practical means of substantially eliminating the effect of the time delay associated with receiving and processing digital television transmissions. The substantial elimination of the effect of the time delay would significantly enhance the user experience by allowing one to enjoy the best attributes that digital television offers while retaining the essentially instantaneous channel changing performance that analog receivers exhibit.

SUMMARY OF THE INVENTION

The present invention comprises a method and an apparatus for predicting what channel a user is likely to select during a viewing session. By using two or more tuners, a primary tuner can be tuned to a first channel. Coincident with the presentation of the first tuned channel, a prediction method uses pre-indications of what channel a user will select to predict a next selected channel. In an alternative method, prediction is made by using historical models of past viewing behavior. In order to more reliably predict what channel a user will select next, one method provides that different historical models can be developed for different viewing time slots. Then, a particular historical model, as dictated by time slot, is used to make a channel selection prediction.

Various types of historical usage models are used by different embodiments of the invention. One is a histogram that maintains a selection count for each channel that a viewer can watch. Multiple histograms are developed according to time slots. Other stochastic models are used to predict what channel a user is likely to select next. Again, different stochastic models can be used for different viewing time slots. Historical usage models are used to predict a next channel, and their prediction can be refined according to a partial channel selection. A partial channel selection may be in the form of individual key strokes entered by a user on a keypad when selecting a channel.

One method provides for receiving a pre-selection indication from a user program guide. Generally, this pre-indication is used as a direct prediction for what channel a user is likely to select next during a viewing session.

Based on a predicted next channel, the method of the present invention provides for receiving an alternate content stream. The alternate content stream is processed in parallel to the primary content stream. Upon receiving a channel selection command, the method provides that the alternate content stream be presented to a user when the user's selected channel matches the channel prediction.

The present invention further comprises a digital content receiver. The content receiver typically has a primary and an alternate tuner for tuning a selected channel. The tuners provide a modulated carrier at an intermediate frequency that can be decoded by primary and alternate decoders. When decoding, the modulated carrier is demodulated in order to recover a multiplexed delivery stream that has a plurality of content streams. Generally, a primary channel is processed and presented to a user. The alternate channel is tuned to receive an alternate channel based on predicting what channel the user is likely to select next. If the user selects a new channel and that selection is equal to the predicted channel processed by the alternate channel, then a selection unit presents the alternate channel to the user.

Prediction of a next selected channel is accomplished according to a pre-indication of a next channel selection. A time-selected usage model can also be used. Accordingly, the content receiver of the present invention comprises a next channel prediction unit.

The next channel prediction unit may take on different forms depending on the prediction method implemented in the receiver. In one embodiment, the prediction unit has a program-guide selection detector that receives an indicator from a user program guide. This can be used as a direct prediction of what channel the user is likely to select next and typically reflects a channel corresponding to a highlighted cursor that the user uses to retrieve additional information about a particular channel.

In another embodiment of the invention, the prediction unit has a plurality of channel count registers. These are used to count the frequency with which each channel has been selected by a user. A most-selected channel monitor ascertains what channel has the greatest histogram value and this is selected as the predicted next channel. The selection is refined according to a partial channel selection; for example individual keypad entries. Multiple sets of counters can also be provided so that a different histogram can be used for channel prediction according to different time slots. In this case, a time-slot index is generated by a clock.

In one another embodiment, the prediction unit has a stochastic prediction engine that generates usage models according to channel selections. Once a stochastic model is developed, any predictions of a next selected channel that are made using the model are tempered according to partial channel selections. Also, different stochastic models can be developed for different time slots and these are selected by the time-slot index generated by the clock.

In yet another embodiment, the invention comprises a digital receiver that is tailored for use as a set top box. In this embodiment, the set top box is controlled by a processor. The processor commands primary and alternate receivers to select specific modulated radio frequency carriers. These are then delivered to primary and alternate signal paths that generate primary and alternate presentation streams. The processor is also programmed to predict what channel a user is likely to select next. Using this prediction, the processor can then command the alternate receiver to select a modulated carrier according to the prediction. The processor commands a selection unit to select the alternate presentation stream if the channel prediction is consistent with a user channel selection command.

The processor is programmed to predict a next selected channel in a number of different ways. In one embodiment of the invention, the processor presents a user program guide, receives navigation commands from the user and predicts a next selected channel according to the position of a channel-selection highlight. If the user engages the high-lighted channel, the processor directs the selection unit to present the alternate presentation stream.

In another embodiment of the set top box, the processor is programmed to develop a histogram according to channel selections. The processor selects the most-often viewed channel that is also consistent with a partial channel selection. The processor can also receive a time slot index from a clock. Using this index, the processor develops and uses a plurality of histograms that correspond to a plurality of time-slots to make a next channel prediction. The processor, in an alternative embodiment of the invention, uses stochastic models that it develops to make predictions. A prediction made using a stochastic model can be refined according to a partial channel selection and multiple stochastic models can be used for different viewing time-slots.

BRIEF DESCRIPTION OF THE DRAWINGS

The foregoing aspects are better understood from the following detailed description of one embodiment of the invention with reference to the drawings, in which.

The components in the figures are not necessarily to scale, emphasis instead being placed upon illustrating the principles of the invention. In the figures, like reference numerals designate corresponding parts throughout the different views

DETAILED DESCRIPTION OF THE INVENTION

Figure 1:
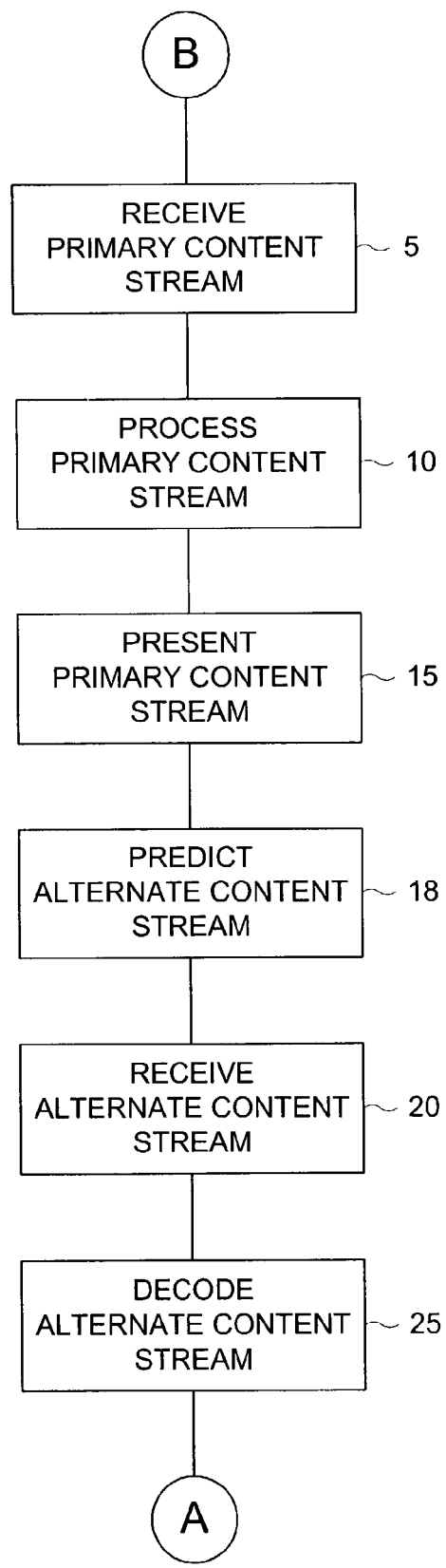
FIG. 1 is a flow diagram that depicts one illustrative method for receiving a primary digital content stream while concurrently processing an alternate stream for a predicted next channel according to the present invention.

FIG. 1 is a flow diagram that depicts one illustrative method for receiving a primary digital content stream while concurrently processing an alternate stream for a predicted next channel according to the present invention. As content streams are received by a receiver system, they are continuously processed in separate paths by two or more content stream receivers and decoders. Generally, only one content stream is presented to a user at any given time. The content stream presented to the user is designated as a "primary" content stream. The invention comprises prediction methods that are used to select additional content streams. These are designated as "alternate" content streams. An alternate content stream will become the primary content stream if a user selects that channel as the next channel to be viewed.

According to one illustrative method, a digital television signal is received and a single channel is selected from a plurality of available channels (step 5). The extracted channel typically comprises a multiplexed data stream comprised of a plurality of digitally encoded content streams. A specific content stream corresponding to a channel selected by a user is extracted from the multiplexed data stream. The content stream may then be processed using decoding and decompression techniques consistent with those originally used in the encoding of the stream (step 10). Additional processing of a content stream is applied in order to decrypt an encrypted content stream. The processed stream is typically in a form that can be conveyed to standard presentation devices such as a television or computer (step 15). A fully processed content stream may also be referred to as a "presentation steam".

The process of initially selecting a new channel and processing a content stream results in noticeable latencies between the time that a channel is selected and the time when it is subsequently available for presentation to a user. The apparent latency can be reduced, or substantially eliminated if an alternate content stream is received and processed at any time before the alternate stream is chosen as the primary content stream. The alternate content stream is received (step 20) and processed (step 25) according to a method analogous to that used to process the primary content stream. The alternate content stream is selected in accordance with a prediction method (step 18). The prediction method identifies a content stream predicted to be the next content stream that a user will choose from among a plurality of content streams.

Figure 2:
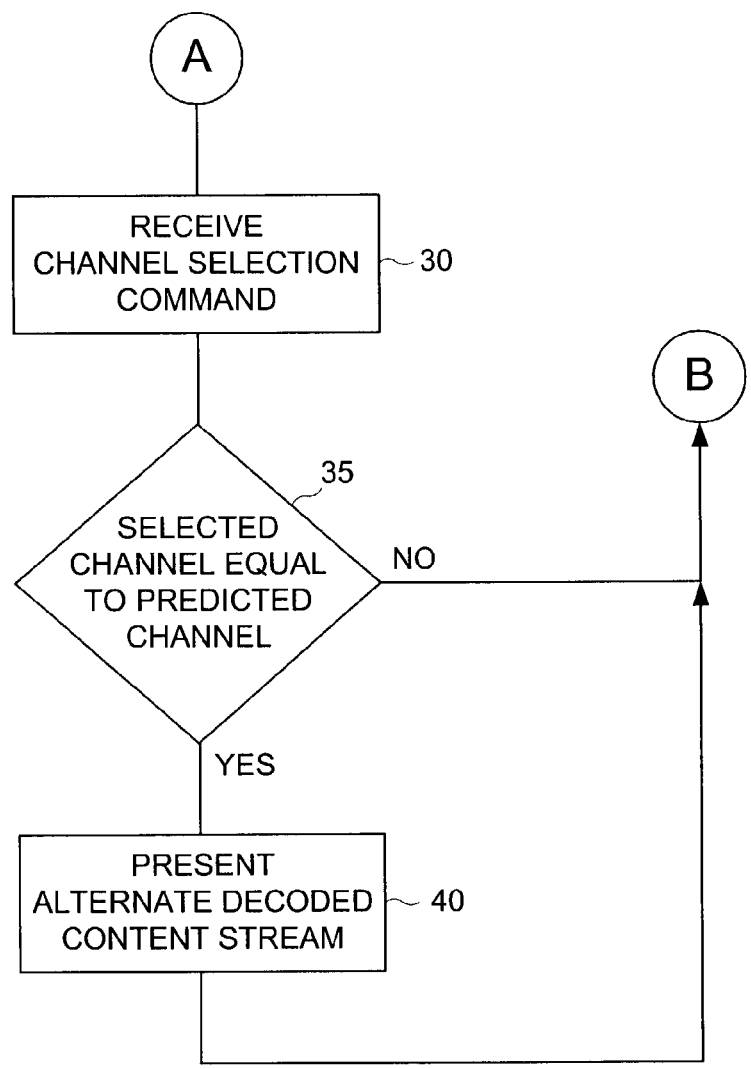
FIG. 2 is a flow diagram that depicts additional process steps according to one example method of the present invention for presenting an alternate content stream to a user.

FIG. 2 is a flow diagram that depicts additional process steps according to one example method of the present invention for presenting an alternate content stream to a user. As already illustrated, the method of the present invention provides that an alternate content stream is received according to a next channel prediction. Once a user actually enters a channel selection command and that command is recognized by a digital reception system (step 30), the method of the present invention determines if the channel selected by a user was correctly predicted by a prediction method that constitutes the invention (step 35). In the event that the predicted next channel is consistent with the channel selection command entered by the user, the method provides that the content stream processed as an alternate content stream should be presented to the user (step 40). It should be noted that, in this instance, the presentation latency ordinarily associated with digital reception can be significantly reduced or potentially eliminated. If the prediction is inconsistent with the channel selection command entered by the user, the primary tuner/decoder path is set to receive the channel specified in the user's channel selection command.

Various methods of the present invention provide for predicting which channel a user may select next during a viewing session. For instance, one method of the present invention provides that a next channel prediction is accomplished by developing a history of past channel selections made by a user during a particular interval of time, or "time-slot". According to yet another method, next channel prediction is accomplished by developing a history of channel selections and then making a refined prediction of a next channel according to a partial channel selection received from a user. An additional method provides for receiving a channel pre-selection indicator from a program guide that a user may use to select a channel.

Figure 3:
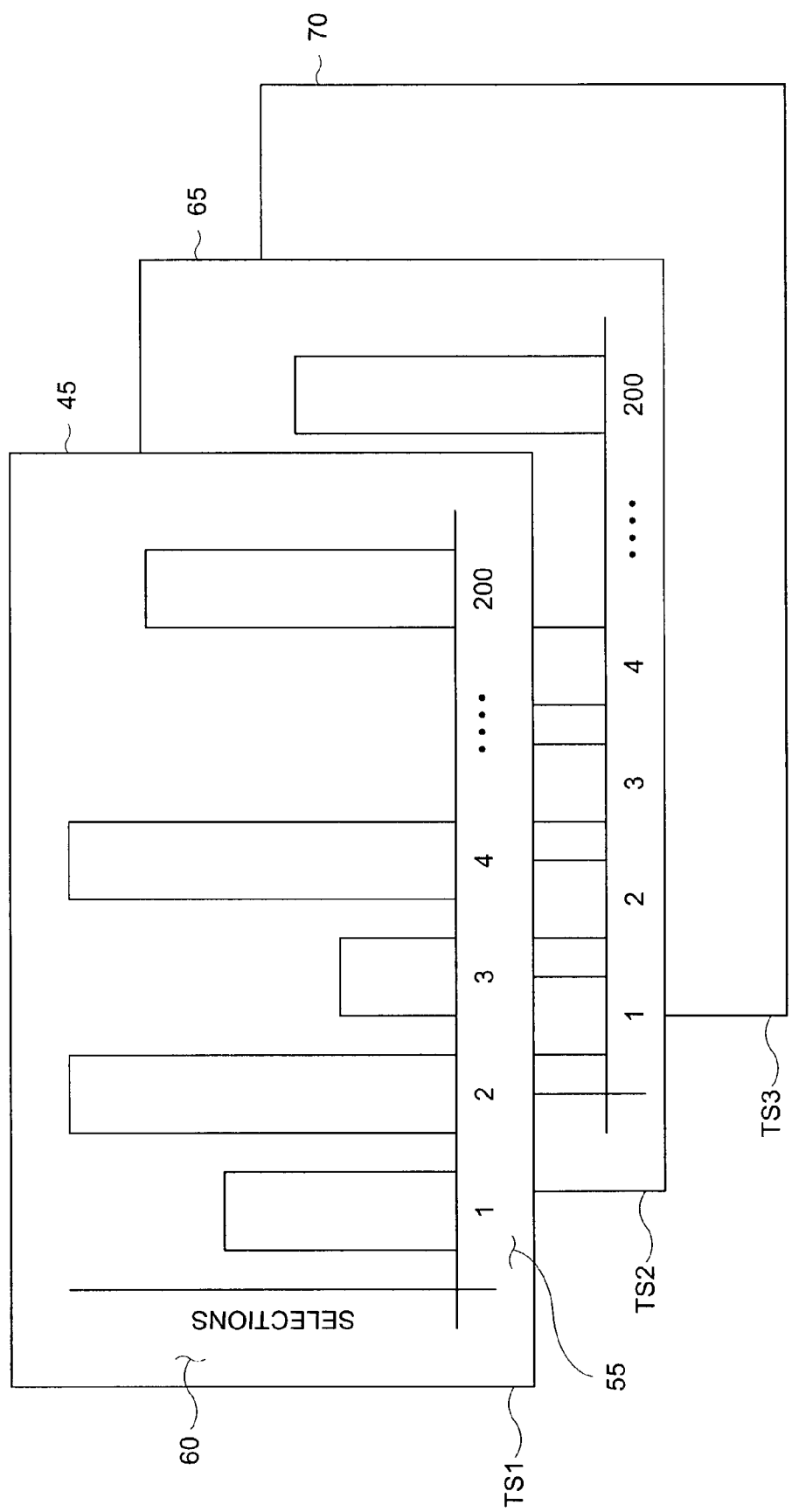
FIG. 3 is a pictorial diagram that depicts a channel selection histogram that is used by one method of the present invention to predict a next selected channel during a particular time slot.

FIG. 3 is a pictorial diagram that depicts a channel selection histogram that is used by one method of the present invention to predict a next selected channel during a particular time slot. According to one illustrative method, records of channel selection commands 45 are compiled so that the number of times 60 a channel 55 is selected is used as the basis for a channel prediction. According to this illustrative method, the channel selected most often by a user during a particular time slot is selected as a predicted next channel. The accuracy of channel prediction is improved by categorizing the channel selection history according to a specific time slot. Note that the figure presents three histograms TS1, TS2 and TS3 (45, 65 and 70) for three different time slots as an example of one method that is not intended to limit the scope of the invention.

The use of time slot information allows the prediction method to take into consideration channel selection behavior having profiles related to time of day, and day of week, month and year. The use of time dependant histogram profiles applies the notion that programming genres and user preferences are time dependant. For example, a household may view children's programming on a particular day of week, news programming at a particular time of day, and network programming in a particular season of the year. Other methods that store and process channel viewing history, such as Markov chains and other stochastic methods, are applied here and refined through the use of time-slots according to other derivative methods of the present invention that may become apparent upon reading of this disclosure.

According to yet another method, a prediction based on user viewing history is refined by receiving a partial channel selection indication. A partial channel selection indication is received as a user enters a channel selection command. In one example method for predicting a next selected channel, a user enters a succession of numerical digits on a keypad to select a channel. Only after the user has entered all of the digits necessary to uniquely identify a channel is a complete channel selection command available and only then can a receiving system ascertain if a next channel prediction is accurate.

As a user enters a first digit, this partial channel selection indication is used according to this method of the present invention to weigh the channel selection prediction that is made according to a histogram, a histogram refined by time slots, or any other historical prediction method including, but not limited to those that employ Markov chains or other stochastic processes refined by time-slots or not. With each subsequent digit entered by a user, additional refinement of a predicted next channel is accomplished. Hence, in one usage example that is not to limit the scope of the present invention, a user enters the digit "2" as the first digit in a succession of digits, a prediction method confidently eliminates all potential next channels not beginning with the digit "2" from a prediction pool. If a user then enters the digit "3", it becomes highly probable that the next channel that a user will select will begin with "23".

Figure 4:
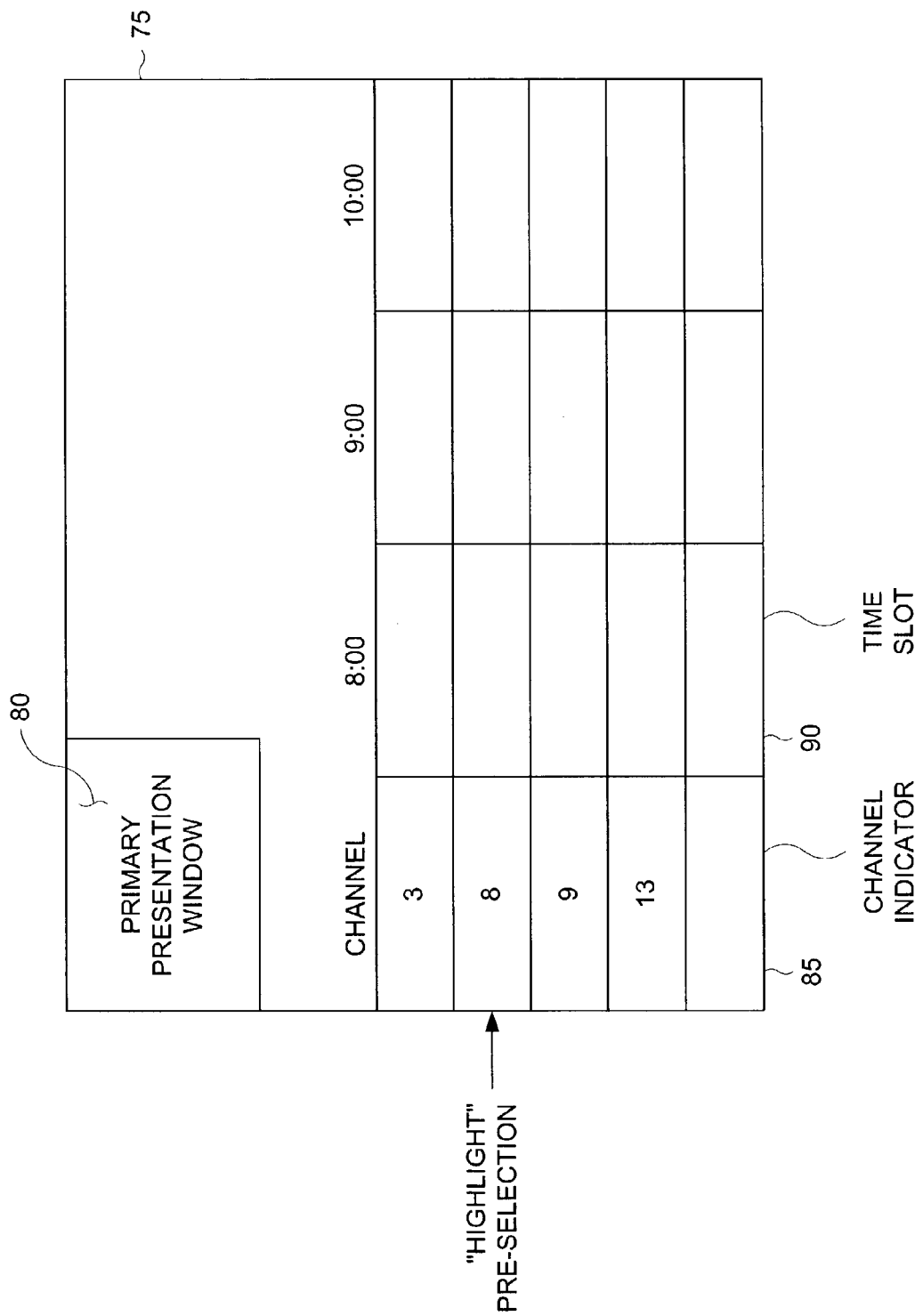
FIG. 4 is a pictorial representation of an example on-screen User Programming Guide (UPG) which is used in next channel prediction according to the present invention.

FIG. 4 is a pictorial representation of an example on-screen User Programming Guide (UPG) which is used in next channel prediction according to the present invention. Many cable television and broadcast satellite systems provide an on-screen UPG 75 which is typically presented on a presentation device, i.e. a television set. A UPG typically provides a text description window representing a portion of the channels available 85 for selection in a particular programming interval 90. A UPG may also include a content presentation window 80 that is used to present video content from a currently selected broadcast channel. This typically corresponds to a "primary" presentation stream.

A user may navigate through the text description for any channel with the use of an input device. As the user navigates, a highlighted cursor 95 typically provides visual feedback of the navigated position in the channel groups. A user may command a channel change by indicating acceptance of the channel "pre-selected" by the highlighted cursor 95. In one illustrate embodiment of the present invention, a next selected channel prediction is accomplished according to the channel corresponding to the position of the highlighted cursor 95 presented on the UPG. Hence, if the highlighted cursor 95 is positioned over "Channel 13", then Channel 13 will be selected as the predicted next channel, i.e. the user is likely to next select channel 13 during a viewing session. This example is provided to help illustrate, but not limit the scope of the method of the present invention.

Figure 5:
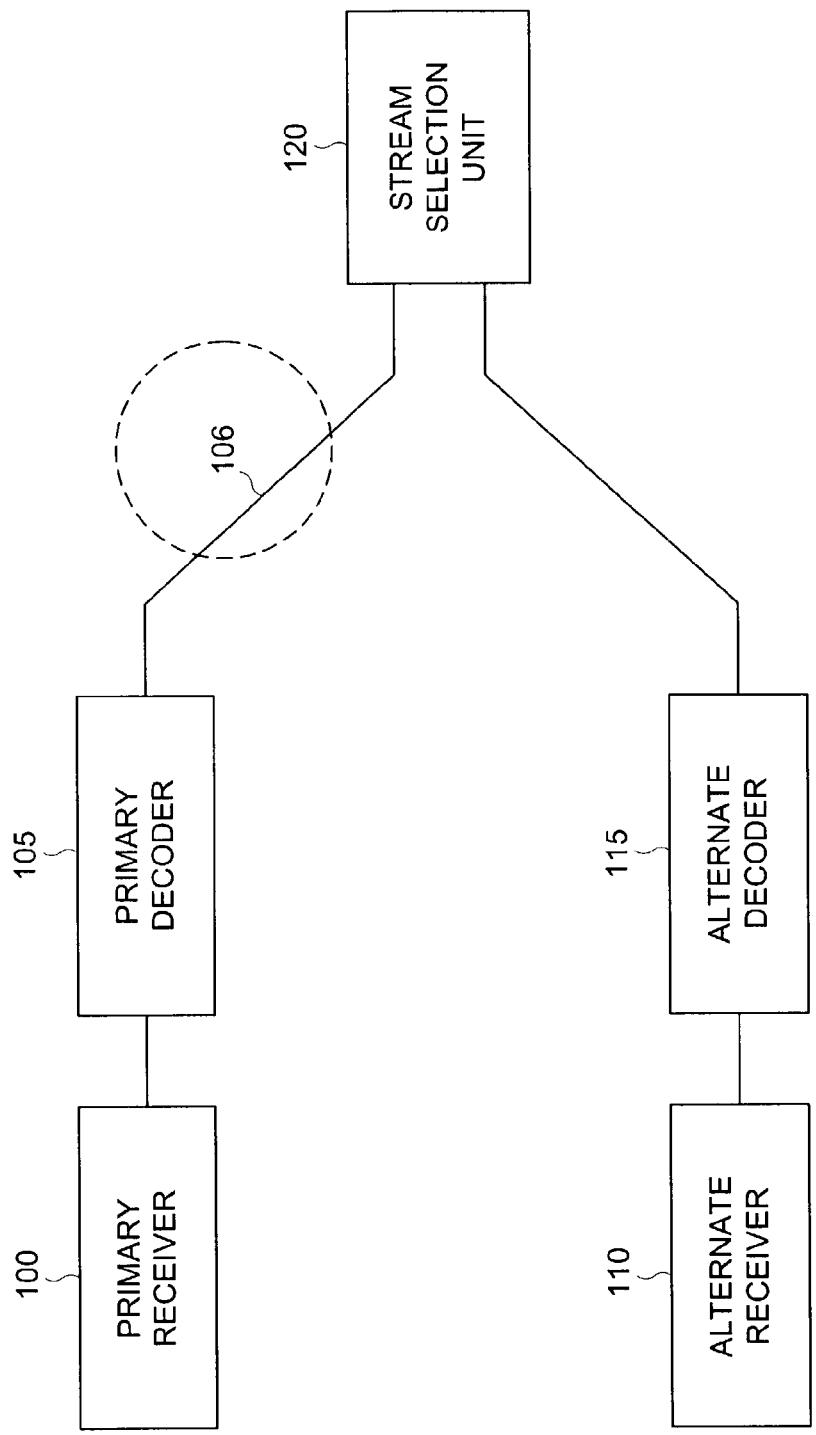
FIG. 5 is a block diagram of one possible structure of a digital receiver that exhibits reduced channel changing latency according to the present invention.

FIG. 5 is a block diagram of one possible structure of a digital receiver that exhibits reduced channel changing latency according to the present invention. According to this illustrative embodiment, a digital receiver may comprise a primary receiver 100, a primary decoder 105, an alternate receiver 110, an alternate decoder 115 and a stream selection unit 120. As the system operates, a primary channel is received by way of the primary receiver 100. Both the primary receiver 100 and the alternate receiver 110 typically are radio frequency tuners that are capable of selecting a single radio frequency carrier channel from an incoming spectrum of electromagnetic energy. In most digital receiver systems, a radio frequency carrier is demodulated in order to recover a multiplexed data stream that is used to carry a plurality of individual content streams. Once a content stream is selected, it is delivered to the primary decoder 105. The primary decoder decompresses and optionally decrypts the content stream in order generate a primary presentation stream 106. According to this illustrative embodiment, the alternate receiver 110 is used to receive an alternate content stream according to a predicted next channel commensurate with the teachings of the present invention. The alternate content stream is decompressed, optionally decrypted and used by the alternate decoder 115 to generate an alternate presentation stream 116.

According to this embodiment, the stream selection unit 120 initially selects the primary presentation stream 106 and propagates this to a presentation device. Once a channel selection command is received from a user, the stream selection unit may select the alternate presentation stream 116 when the predicted next channel is consistent with the channel selection command received from the user. In this event, the context of "primary" and "alternate" are switched. When the predicted next channel is not consistent with the channel selection command received from the user, the primary receiver is commanded to receive the channel specified by the channel selection command.

Figure 6:
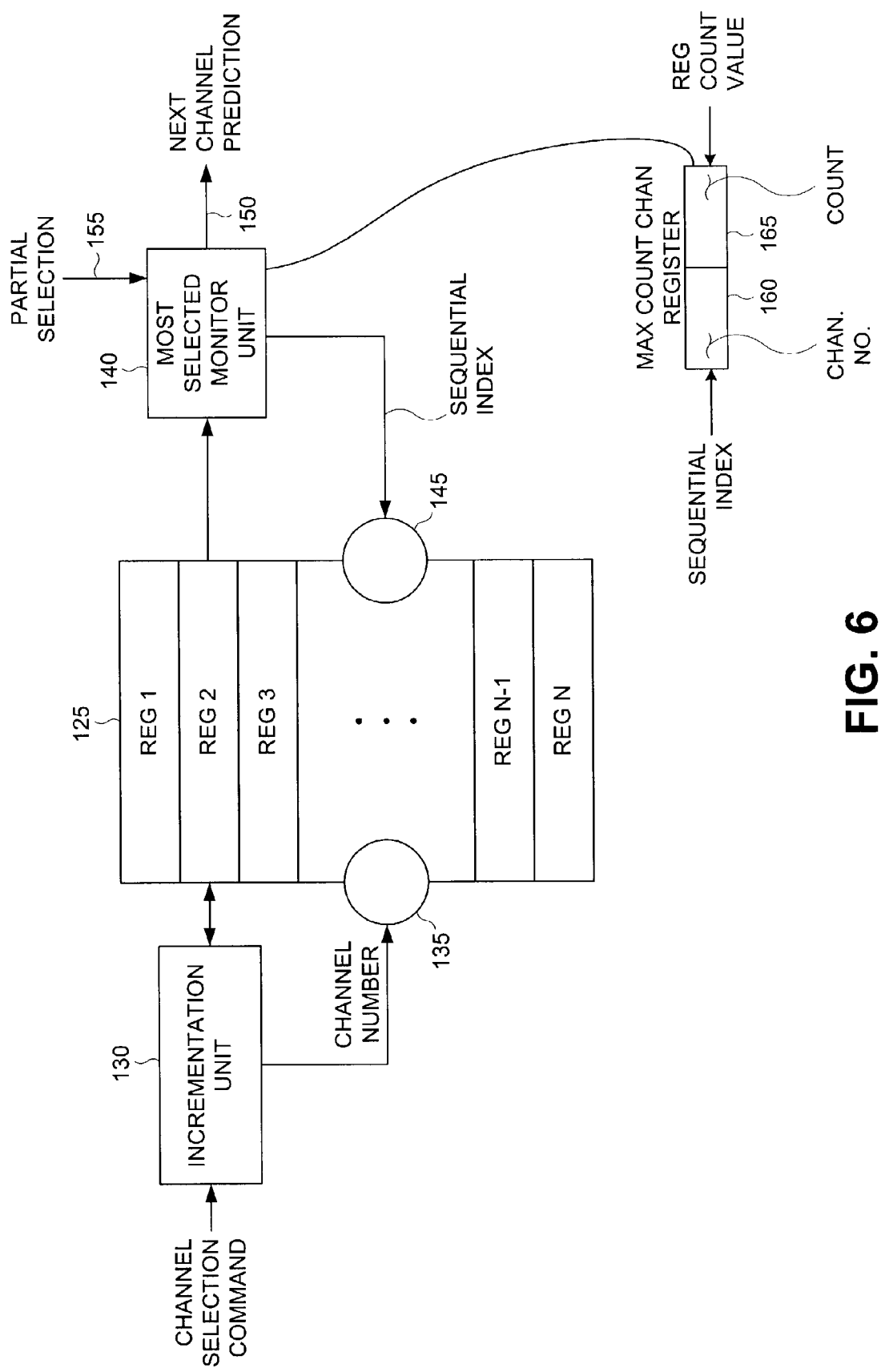
FIG. 6 is a block diagram that illustrates one example structure of a next channel prediction unit that generates a next channel prediction based on channel selection history according to the present invention.

FIG. 6 is a block diagram that illustrates one example structure of a next channel prediction unit that generates a next channel prediction based on channel selection history according to the present invention. This example embodiment of a next channel prediction unit comprises a plurality of channel count registers 125. Typically, there will be one channel count register for every channel that a user may select. Further comprising the channel prediction unit is a channel count incrementation unit 130 that, upon receiving a channel selection command from a user generates a channel number index 135 according to the channel selection command. This is typically used to select one channel count register from among the plurality 125. The incrementation unit 130 retrieves a count value from the selected channel count register, increments that value and then replaces the content of the register with the incremented value.

This illustrative embodiment of the invention further comprises a most-selected channel monitor 140. The most-selected channel monitor 140 further comprises a most-selected channel register that is used to store a channel number 160 and a count value 165. In operation, the most-selected channel monitor 140 typically generates a sequential index 145 in order to retrieve a count value from one channel count register in the plurality of channel registers 125. As count values are retrieved from successive count registers, the count value and the index 145 are stored in the most-selected channel register if the value stored in the most-selected channel register is less than the count value received from the channel count register selected according to the sequential index 145. In this manner, the next channel prediction unit may ascertain the most commonly selected channel and return that channel as a predicted next channel.

In order to further refine a selection, the most-selected channel monitor 140 in one embodiment receives a partial channel selection indicator 155. This is used to preclude certain channels from being represented in the most-selected channel register. This is accomplished by "gating off" the signal used to store values in the most-selected channel register when the sequential index 145 is inconsistent with a partial channel selection indicator 155 that the most-selected channel monitor 140 may receive.

Figure 7:
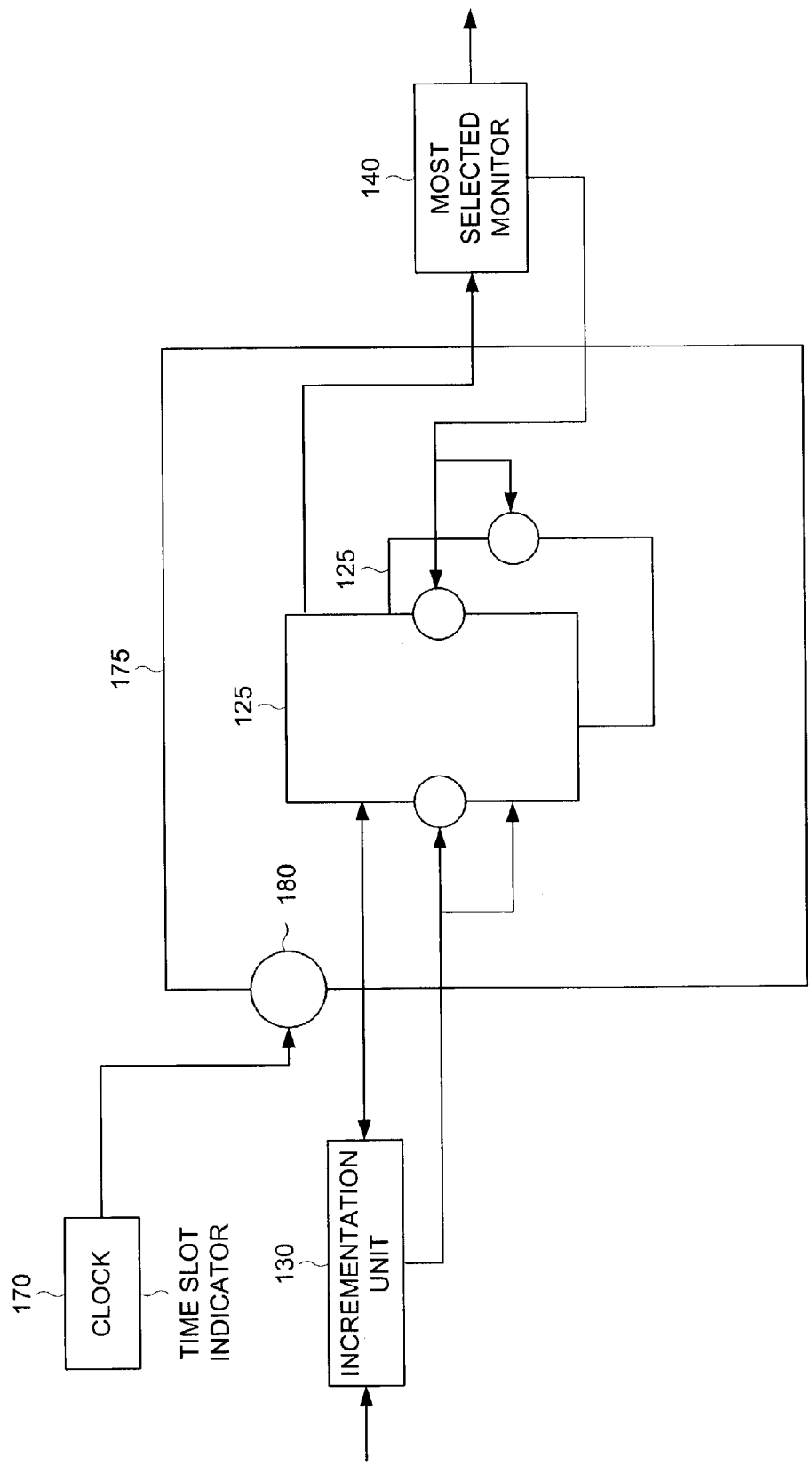
FIG. 7 is a block diagram that depicts an alternative embodiment of the invention wherein a next channel prediction unit refines channel prediction according to viewing time slots.

FIG. 7 is a block diagram that depicts an alternative embodiment of the invention wherein a next channel prediction unit refines channel prediction according to viewing time slots. According to this alternative embodiment, the next channel prediction unit comprises a plurality 175 of sets of channel count registers 125. In order to select one set of channel count registers 125, this embodiment further comprises a clock 170 that is used to generate a time slot index 180. Operating akin to other embodiments heretofore described, this embodiment of the invention further comprises an incrementation unit 130 and a most-selected channel monitor 140. The incrementation unit 130 receives channel selection commands and increments the count value in a corresponding channel count register in the set of count registers selected according to the time slot index 180. The most-selected channel monitor 140 ascertains the most commonly selected channel by examining the contents of a set of channel count registers wherein a set of channel count registers is selected according to the time-slot index 180. The most-selected channel monitor, in one alternative embodiment of the invention, further refines a next channel prediction according to a channel pre-selection indicator as described supra.

Other embodiments of the present invention may comprise a next channel prediction unit that receives channel selection commands and generates a stochastic model, for example a Markov chain, to describe past user viewing selections. Different stochastic models are maintained and used according to the time slot index 180. In yet another embodiment of the invention, a stochastic model prediction is refined to reflect a partial channel selection indicator according to the teachings of the present method described herein.

Figure 8:
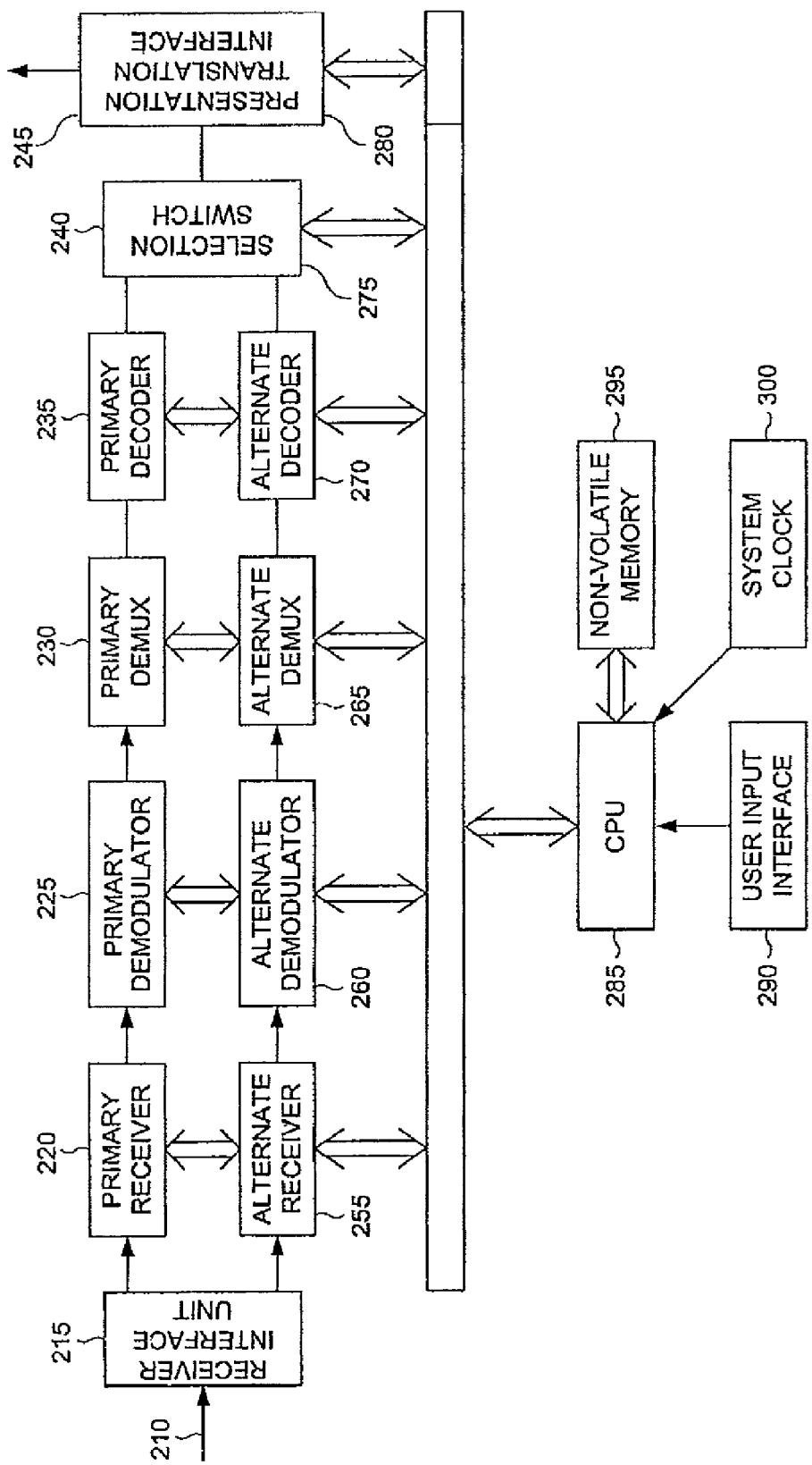
FIG. 8 is a block diagram that illustrates one possible structure of a digital content receiver configured as a set top box.

FIG. 8 is a block diagram that illustrates one possible structure of a digital content receiver configured as a set top box. The method and apparatus of the present invention is embodied in various forms, including, but not limited to a set top box that is used to receive digital signals from cable television systems, satellite television systems and over-air digital television stations. The example embodiment here described may also be integrated into a presentation device, for instance a television or a video monitor.

According to this example embodiment, a set top box comprises a radio frequency (RF) interface 215 that is capable of accepting a spectrum of electromagnetic energy 210 and partitioning the energy among two or more receivers. In one additional embodiment, the set top box further comprises a primary receiver 220 and an alternate receiver 255. Following the signal path of a primary content stream, the primary receiver 220 may select a particular RF carrier signal from the portion of electromagnetic energy that it receives from the RF interface 215. According to one alternative embodiment of the invention, receivers can be either analog or digital tuners that are commanded to receive a particular frequency.

A set top box according to this example embodiment further comprises a processor 285, a user interface 290, and program memory. The program memory is typically formed from a non-volatile memory 295. Most embodiments of the preset invention further comprise a working memory that is used to store operating variables and a processor "stack" onto which the processor 285 may temporarily store information. According to one alternative embodiment of the present invention, a set top box further comprises a system clock 300. Further comprising the invention are various instruction sequences that are executed by the processor 285 and that are described infra.

The output of the primary and alternate receivers typically are modulated RF carriers centered at some intermediate frequency (IF). A set top box, according to the invention, further comprises primary and alternate demodulators 225, 260. These may receive, respectively, primary and alternate IF modulated carriers and demodulate these into primary and alternate delivery streams.

Commensurate with most digital techniques, a delivery stream has several time-multiplexed content streams. In order to select one content stream from the multiplexed delivery stream, a demultiplexer is normally used. Hence, this example embodiment of the present invention may comprise a primary demultiplexer 230 and an alternate demultiplexer 265. Specific primary and alternate content streams may then be delivered to primary and alternate decoders 235, 270.

These decoders may decompress digital video content streams. In one example embodiment, the content stream is in MPEG I or MPEG II format. The decoders are typically selected according to the encoding scheme used in a particular digital system. The decoders optionally decrypt content that is conveyed to the set top box in an encrypted form. Said content is typically encrypted in order to prevent unauthorized viewing of the content.

The output of the primary and alternate decoders typically comprises uncompressed (and possible decrypted) presentation streams. A set top box, at least according to one alternative embodiment, further comprises a selection unit 240 that can be commanded to select from among various presentation streams generated by the primary or alternate decoders. It should be noted that some embodiments of the invention may comprise a plurality of alternate signal processing paths. In these embodiments, the selection unit 240 may comprise more than two inputs.

Figure 9:
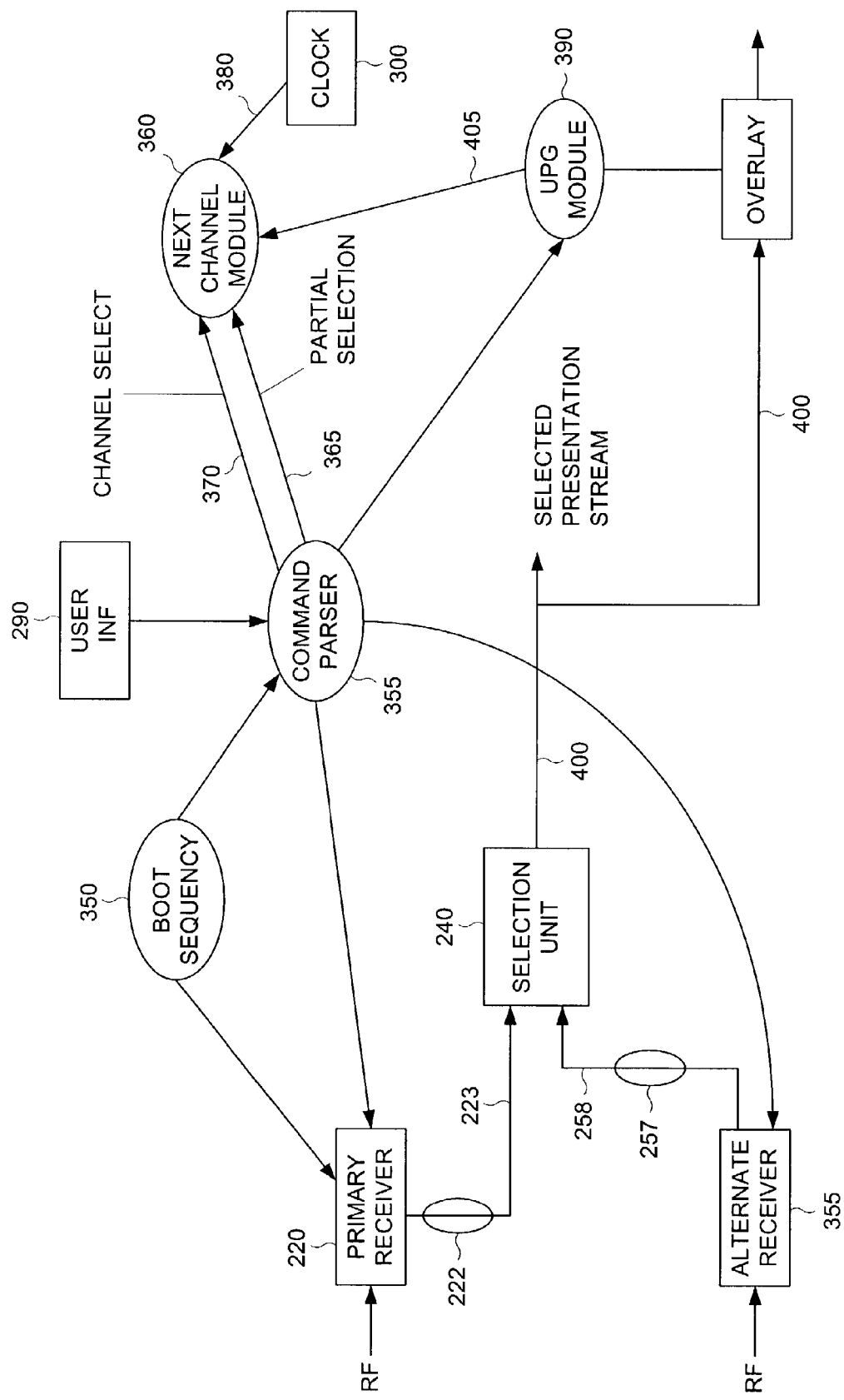
FIG. 9 is a data flow diagram that depicts one possible internal structure of a set top box that exhibits reduced channel changing latency according to the present invention.

FIG. 9 is a data flow diagram that depicts one possible internal structure of a set top box that exhibits reduced channel changing latency according to the present invention. According to this alternative embodiment of the invention, a set top box further comprises an instruction sequence called the "boot" sequence 350, that is typically stored in the non-volatile memory 295 and executed by the processor 285. One function of the boot sequence 350 is to cause the processor 285 to command the primary receiver 220 to receive a modulated RF carrier that carries a digital delivery stream containing a primary channel according to a channel value stored in a primary channel variable. This modulated RF carrier is processed in accordance with the signal path 222 described above and emerges as a primary presentation stream 223 that may be selected by the selection unit 240.

The invention may further comprise a command parser instruction sequence 355 and a next channel prediction instruction sequence 360, both of which are typically stored in the non-volatile memory 295. As the set top box continues to operate, the boot sequence 350 may further cause the processor to execute the command parser instruction sequence 355. One of the functions of the command parser instruction sequence is to cause the processor 285 to receive commands from the user interface 290. In some embodiments of the invention, the command parser 355 will dispatch a signal to the next channel prediction instruction sequence. According to one embodiment of the invention, this signal is a partial channel selection 365. In yet a different embodiment, this signal is a completed channel selection command 370.

In one alternative embodiment of the present invention, the next channel prediction instruction sequence, as one of its functions, causes the processor 285 to develop a histogram of channel selection commands according to the teachings of the present method. Hence, the prediction instruction sequence 360 causes the processor 285 to maintain a plurality of channel-count variables, each of which is incremented when a corresponding channel selection command 370 is received. In order to predict a next channel, the prediction instruction sequence 360, according to an alternative embodiment of the invention also causes the processor 285 to ascertain which channel-count variable contains the largest value. According to this example embodiment, the processor 285 selects a channel-count variable that is consistent with a partial channel selection 365 that is received from the command parser 355.

According to yet another example embodiment, the next channel prediction instruction sequence 360 receives a time-slot indicator 380 from the system clock 300. Using this time-slot indicator as a selector, the processor 285 develops and uses for prediction a plurality of histograms for each of a plurality of possible time slots.

Other embodiments of the invention use these techniques with stochastic models. For example, one embodiment of the invention uses a Markov chain. Accordingly, one function of the next channel prediction instruction sequence 360 is to cause the processor 285 to develop a stochastic model as channel selection commands 370 are received. When making a next channel prediction, one embodiment of the invention uses partial channel selections 365 to refine the prediction according to the teachings of the present method. In one alternative embodiment of the present invention, the next channel prediction instruction sequence 360 receives a time-slot indicator 380 and uses this to distinguish one model from a plurality of stochastic models corresponding to a plurality of possible time-slots. In yet another embodiment of the invention, the processor, as a result of executing the next channel prediction instruction sequence selects a particular stochastic model according to a time slot indicator 380 and then refines a prediction from that model to be consistent with a partial channel selection.

In yet another alternative embodiment of the present invention, a set top box may further comprise a user program guide instruction sequence 390 that is stored in the program memory. Typically, the command parser 355 instruction sequence will cause the processor 285 to execute the user program guide instruction sequence 390 in response to a program guide selection command that it can receive by way of the user interface 290. According to this alternative embodiment, the user program guide instruction sequence 390 causes the processor 285 to generate a program guide. This is then presented to a user as an overlay to the selected presentation stream 400. As a user navigates through the program guide using scrolling commands received by the processor 285 by way of the user interface 290, the command parser 355 forwards navigation signals to the user program guide instruction sequence 390. In response, the user program guide instruction sequence causes the program guide to present a selection highlight to the user. This selection highlight 405 is then converted to a channel prediction by the processor 285 as it continues to execute the next channel prediction instruction sequence 360.

When the processor 285 recognizes a channel selection command as it executes the command parser instruction sequence 255, it may determine that the channel selected by a user matches the predicted next channel as predicted by the next channel prediction instruction sequence 360. In this case, the command parser instruction sequence 255 causes the processor 285 to command the selection unit to present the alternate presentation stream to the user. Otherwise, the primary channel is commanded to process and present the channel selected by the user.

ALTERNATIVE EMBODIMENTS

While this invention has been described in terms of several preferred embodiments, it is contemplated that alternatives, modifications, permutations, and equivalents thereof will become apparent to those skilled in the art upon a reading of the specification and study of the drawings. It is therefore intended that the true spirit and scope of the present invention include all such alternatives, modifications, permutations, and equivalents.

What is claimed is:

1. A method for receiving broadcast digital content, the method comprising the steps of:
 processing a primary content stream, the processing step including: receiving the primary content stream; and decoding and decompressing the received primary content stream into a primary presentation stream;
 processing an alternate content stream, the processing step including:
  receiving the alternate content stream according to at lest one of a pre-indication of a next channel selection and a time-selected usage profile; and
  decoding and decompressing the received alternate content stream into an alternate presentation stream;
 presenting the primary presentation stream on a presentation device; receiving a channel selection command; and
 presenting the alternate presentation stream on the presentation device when the channel selection command is equal to a predicted next channel wherein the step of processing a primary content stream and the step of processing an alternate content stream are concurrently performed, and
 the step of receiving an alternate content stream comprises: receiving a channel selection command; selecting, from among multiple different stochastic predication models, a stochastic prediction model according to the channel selection command and said time-selected usage profile; and using the selected stochastic prediction model to identify a most probable channel as an alternate content stream according to a partial channel selection and said time-selected usage profile.

2. A method for receiving broadcast digital content comprising the steps of:
 processing a primary content stream, the processing step including: receiving the primary content stream; and decoding and decompressing the received primary content stream into a primary presentation stream;
 processing an alternate content stream, the processing step including:
 receiving the alternate content stream according to a pre-indication of a next channel selection and a time-selected usage profile; and
  decoding and decompressing the received alternate content stream into an alternate presentation steam;
 presenting the primary presentation stream on a presentation device;
 receiving a channel selection command; and
 presenting the alternate presentation stream on the presentation device when the channel selection command is equal to a predicted next channel wherein the step of processing a primary content stream and the step of processing an alternate content stream are concurrently performed, and
 the step of receiving an alternate content stream comprises: receiving a channel selection command; selecting, from among multiple different stochastic predication models, a stochastic prediction model for a time slot according to the channel selection command; and receiving a most probable channel according to the selected stochastic prediction model for a particular time slot refined by a partial channel selection.

3. A content receiver system comprising: a primary receiver for receiving a primary content stream;
 a primary decoder that decodes and decompresses the received primary content stream into a primary presentation stream;
 a prediction unit that generates a next channel prediction according to a channel pre-selection indication and a time-selected usage profile;
 an alternate channel receiver that receives an alternate content stream according to the next channel prediction;
 an alternate decoder that decodes and decompresses the received alternate content stream into an alternate presentation stream; and
 a content stream selection unit that:

selects the primary presentation stream; receives a channel selection command or a partial channel selection; and selects the alternate presentation stream when the channel selection command is equal to a next channel prediction, wherein:

the primary decoder and the alternate decoder decode and decompress the received primary content stream and the received alternate content stream concurrently, and said prediction unit comprises a stochastic prediction engine that: selects, from among multiple different stochastic prediction models, a stochastic prediction model according to the channel selection command and the time-selected usage profile; and generates a predicted next channel using the selected prediction model as refined by the partial channel selection.

4. The content receiver system of claim 3, wherein the prediction unit comprises a program guide pre-selection receiver that receives a signal according to a highlighted program guide channel selection.

5. The content receiver system of claim 3, wherein the prediction unit comprises: a plurality of channel-selected count registers; and a channel incrementation unit that receives a channel selection command and increments one of the plurality of channel-selected count registers according to the channel selection command, and wherein the selected prediction model generates a next channel prediction by identifying a channel corresponding to the highest-valued channel-selected count register consistent with the partial channel selection.

6. The content receiver system of claim 3, wherein the prediction unit comprises:

a clock that generates a time-slot indicator;

a plurality of channel-selected count registers for each of a plurality of time slots; and a channel incrementation unit that:

selects one plurality of channel-selected count registers according to the time-slot indicator; and increments, according to the channel selection command, one of the channel-selected count registers in the selected plurality of channel-selected count registers, and wherein the selected prediction model:

selects one plurality of channel-selected count registers according to the time-slot indicator; and generates a next channel prediction by identifying a channel corresponding to the highest-valued channel-selected count register from among the plurality of count registers in the selected plurality of channel-selected count registers.

7. A content receiver system comprising: a primary receiver for receiving a primary content stream;

a primary decoder that decodes and decompresses the received primary content stream into a primary presentation stream;

a prediction unit that generates a next channel prediction according to a channel pre-selection indication and a time-selected usage profile;

an alternate channel receiver that receives an alternate content stream according to the next channel prediction;

an alternate decoder that decodes and decompresses the received alternate content stream into an alternate presentation stream; and a content stream selection unit that:

selects the primary presentation stream; receives a channel selection command or a partial channel selection; and selects the alternate presentation stream when the channel selection command is equal to a next channel prediction wherein the primary decoder and the alternate decoder decode and decompress the received primary content stream and the received alternate content stream concurrently, and the prediction unit comprises: a clock that generates a time-slot indicator; and a stochastic prediction engine that: generates a plurality of different stochastic prediction models for a plurality of time slots according to a partial channel selection command; selects, from among the plurality of different stochastic predication models, a stochastic prediction model according to the time-slot indicator and said partial channel section command; and generates a predicted next channel according to the selected stochastic prediction model and according to the time-slot indicator and said partial channel selection command.

8. A set top box comprising: a primary receiver that selects a primary modulated carrier; a primary signal path that generates a primary presentation stream according to the primary modulated carrier, the primary signal path including a primary decoder for decoding and decompressing the selected primary modulated carrier;

an alternate receiver that selects an alternate modulated carrier; an alternate signal path that generates an alternate presentation stream according to the alternate modulated carrier, the alternate signal path including an alternate decoder for decoding and decompressing the selected alternate modulated carrier;

a selection unit that selects a presentation stream for presentation on a presentation device;

a processor that is programmed to:

command the primary receiver to receive a primary channel;

predict a next selected channel according to a preselection indication and a time-selected usage profile;

command the alternate receiver to receive an alternate channel; receive a channel selection command;

command the selection unit to select the alternate presentation stream when the channel selection command is consistent with the predicted next selected channel wherein the primary decoder and the alternate decoder decode and decompress the selected primary modulated carrier and the selected alternate modulated carrier concurrently, and the processor predicts a next selected channel by: selecting, from among multiple different stochastic models, a stochastic model according to the channel selection command and the time-selected usage profile; receiving a partial channel selection; and selecting the most probable channel according to the selected stochastic model.

9. The set top box of claim 8, wherein the selected stochastic model includes a plurality of histogram for a plurality of time-slots and the processor predicts a next selected channel by: receiving a time slot indicator; and selecting the most often selected channel from a histogram selected according to the time slot indicator.

10. The set top box of claim 8, wherein the selected stochastic model includes a histogram channel profile and the processor predicts said next selected channel by: receiving said partial channel selection; and selecting the most often selected channel from the histogram that is consistent with the partial channel selection.

11. A set top box comprising: a primary receiver that selects a primary modulated carrier; a primary signal path that generates a primary presentation stream according to the primary modulated carrier, the primary signal path including a primary decoder for decoding and decompressing the selected primary modulated carrier;
   an alternate receiver that selects an alternate modulated carrier; an alternate signal path that generates an alternate presentation stream according to the alternate modulated carrier, the alternate signal path including an alternate decoder for decoding and decompressing the selected alternate modulated carrier;
   a selection unit that selects a presentation stream for presentation on a presentation device;
   a processor that is programmed to:
   command the primary receiver to receive a primary channel;
predict a next selected channel according to a preselection indication and a time-selected usage profile;
   command the alternate receiver to receive an alternate channel;
receive a channel selection command;
   command the selection unit to select the alternate presentation stream when the channel selection command is consistent with the predicted next selected channel:
wherein: the primary decoder and the alternate decoder decode and decompress the selected primary modulated carrier and the selected alternate modulated carrier concurrently, and
   the processor predicts a next selected channel by: developing a plurality of different stochastic models for a plurality of time slots; receiving a time slot indicator; receiving a partial channel selection; selecting, from among the plurality of different stochastic models, a stochastic model according to the time-slot indicator and the partial channel selection; and selecting the most probable channel consistent with the partial channel selection according to the selected stochastic model selected and according to the time slot indicator.

* * * * *